US006882655B1

United States Patent
Isoyama et al.

(10) Patent No.: US 6,882,655 B1
(45) Date of Patent: Apr. 19, 2005

(54) SWITCH AND INPUT PORT THEREOF (75) Inventors: Kazuhiko Isoyama, Tokyo (JP); Yuich Tasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/566,944

(22) Filed: May 8, 2000

(30) Foreign Application Priority Data

May 13, 1999 (JP) .......................................... 11-132613

(51) Int. Cl.$^7$ ............................................... H04J 7/00
(52) U.S. Cl. ..................................... 370/415; 370/235
(58) Field of Search ................................. 370/412, 413, 370/414, 415, 416, 235, 389, 401

(56) References Cited

U.S. PATENT DOCUMENTS

| | | | | |
|---|---|---|---|---|
| 5,416,769 | A | * | 5/1995 | Karol ........................... 370/414 |
| 5,455,825 | A | | 10/1995 | Lauer et al. ................... 370/60 |
| 5,999,534 | A | | 12/1999 | Kim ............................ 370/395 |
| 6,104,700 | A | * | 8/2000 | Haddock et al. ............. 370/412 |
| 6,160,812 | A | * | 12/2000 | Bauman et al. .............. 370/416 |
| 6,185,221 | B1 | * | 2/2001 | Aybay .......................... 370/412 |
| 6,262,986 | B1 | | 7/2001 | Oba et al. |

FOREIGN PATENT DOCUMENTS

| | | |
|---|---|---|
| EP | 0681385 A2 | 4/1995 |
| EP | 0 803 449 A2 | 11/1997 |
| JP | 4-104540 | 4/1992 |
| JP | 7-297831 | 11/1995 |
| JP | 08-056230 | 2/1996 |
| JP | 9-83547 | 3/1997 |
| JP | 10-200550 | 7/1998 |
| JP | 11-8652 | 1/1999 |
| WO | WO 99/03237 | 6/1998 |

* cited by examiner

*Primary Examiner*—Chi Pham
*Assistant Examiner*—Keith M. George
(74) *Attorney, Agent, or Firm*—Foley & Lardner LLP (57) ABSTRACT

In a switch provided on a network for transferring data, a switch unit includes a scheduler for setting a switch core and an input port unit includes a data allotting unit for allotting transfer data on a priority basis, buffers provided corresponding to the priorities for temporarily storing and outputting the allotted transfer data, a request aggregating unit for aggregating connection requests related to transfer data which are allotted on a priority basis, allotting the connection requests in accordance with the priorities which are taken into consideration in processing by the scheduler and outputting the obtained requests, and a data aggregating unit for aggregating transfer data output from the buffers and transmitting the aggregated data to the switch core.

15 Claims, 5 Drawing Sheets

| REQUEST ALLOTMENT TABLE | |
|---|---|
| BUFFER CLASS | SCHEDULER CLASS |
| CLASS 1 | CLASS 1 |
| CLASS 2 | CLASS 2 |
| CLASS 3 | CLASS 2 |
| CLASS 4 | CLASS 2 |

FIG. 4 PRIOR ART

| Ver. | HEADER LENGTH | SERVICE TYPE | HEADER LENGTH | |
|---|---|---|---|---|
| ID | | | FLAG | FRAGMENT OFFSET |
| TTL | | HOST PROTOCOL | CHECK SUM | |
| TRANSMISSION SOURCE ADDRESS | | | | |
| DESTINATION ADDRESS | | | | |

SWITCH AND INPUT PORT THEREOF

BACKGROUND OF THE INVENTION

1. Field of the Invention

The present invention relates to a packet switch and a cell switch (hereinafter, simply referred to as a switch) for use in data transfer on a network and, more particularly, to a switch and an input port thereof for conducting switch scheduling according to priories set at data.

2. Description of the Related Art

For data traffic on Internet, none of QoS (Quality of Service) of traffic called best effort is conventionally provided with respect to band, delay, fluctuation, etc. In other words, a switch which transfers IP packets, when receiving a packet only transfers the packet by QoS which can be provided at the time of the packet reception but provides no QoS assurance.

Under these circumstances, the advent of such protocols as RSVP (Reservation Protocol) and DiffServ (Differentiated Service) makes it possible to assure QoS of traffic as a protocol in the field of Internet.

Also with respect to a switch, technique is proposed which enables assurance of QoS with traffic classified according to QoS. One of conventional techniques of this kind is, for example, a switch disclosed in Japanese Patent Laying-Open (Kokai) No. Heisei 10-200550.

On the other hand, a function provided by VoIP (Voice over IP) and the like enables telephone voice to be accumulated by Internet and telephone service providers have made a move toward realizing a telephone network by Internet. Requirements and conditions for QoS assurance in Internet have accordingly become more stringent in recent years.

Figure 8:
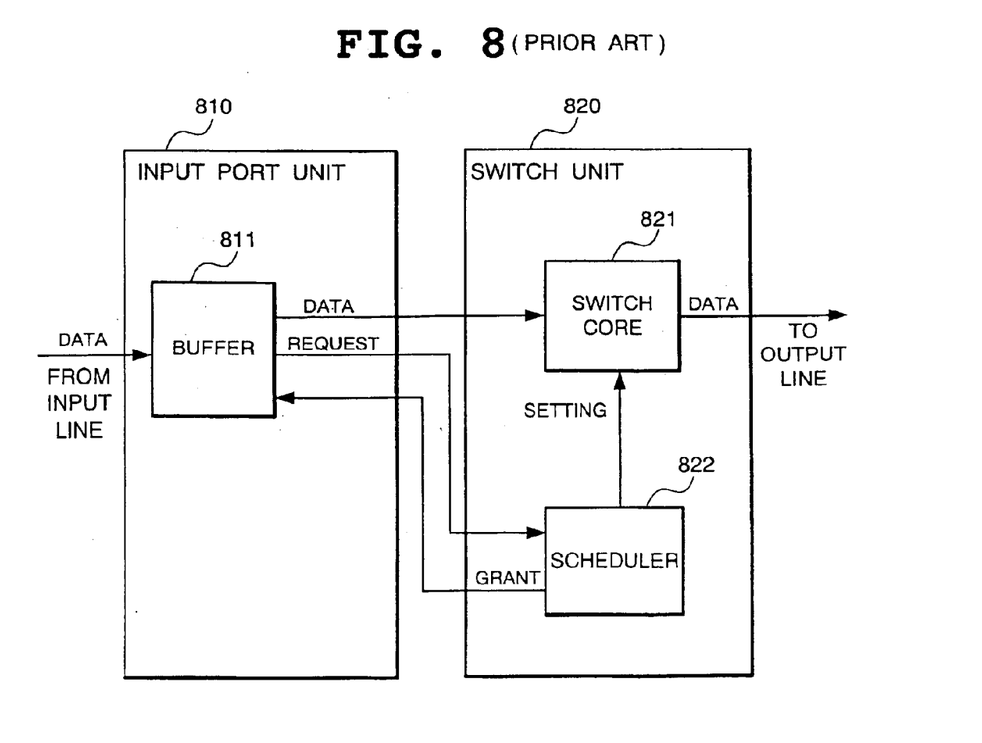
FIG. 8 is a block diagram showing a structure of a conventional switch.

FIG. 8 shows a structure of a conventional switch. With reference to FIG. 8, the conventional switch includes an input port unit 810 for receiving data and a switch unit 820 for executing switching processing. Although the input port units 810 exist as many as the number of ports of the switch unit 820, only one port unit is illustrated here for the convenience of explanation. The input port unit 810 includes a buffer 811 for temporarily holding input data. The switch unit 820 includes a switch core 821 for switching and outputting data applied through the input port unit 810 and a scheduler 822 for setting connection of the switch core 821 to control switching.

In thus structured conventional switch, the input port unit 810, upon receiving input data, holds the data in the buffer 811 and for requesting connection of the data to an output destination, sends a request for connection to the output port to the scheduler 822.

The scheduler 822 examines a connection request received from each input port unit 810 to conduct switch scheduling so as to prevent connections from the input ports to the output ports colliding from each other. Then, according to the scheduling results, the scheduler sets a connection of the switch core 821, as well as returning a grant signal indicative of connection allowance to the input port unit 810.

The input port unit 810 having received a grant signal from the scheduler 822 transmits data directed to the output port of the connection destination notified by the grant signal to the switch core 821 of the switch unit 820. Then, the switch core 821 conducts switching according to the setting by the scheduler 822 and transmits the received data to each output port.

In switch scheduling according to the above-described conventional technique, however, uniform scheduling is conducted taking none of quality and priority of data to be switched into consideration. It is therefore impossible to realize switching according the quality of traffic when such traffic as telephone voices whose delay characteristics are imposed severe requirements is transferred through Internet and when traffic having a plurality of protocols whose quality and characteristics are different is accommodated in one switch.

Under these circumstances, proposed is a switch which, with information indicative of priority applied to data, conducts scheduling in accordance with the priority by a scheduler. Conventional technique of this kind is, for example, disclosed in Japanese Patent Laying-Open (Kokai) No. Heisei 8-56230. The literature discloses a switching system which realizes switch scheduling according to priority. The switching system disclosed in the literature schedules traffic of every priority simultaneously by one scheduler.

As described in the foregoing, since conventional switch scheduling is uniform taking none of quality and priority of data to be switched into consideration, there occurs a case where switching in accordance with quality of traffic can not be realized.

Also with respect to the switching system recited in Japanese Patent Laying-Open No. Heisei 8-56230 which realizes switching scheduling in accordance with priorities, since scheduling is conducted by one scheduler which determines all the priorities, the system structure is complicated. Another shortcoming of the system is that special scheduling algorithms are required for simultaneously conducting scheduling in response to connection requests of all the priorities, which makes flexible change of setting impossible.

SUMMARY OF THE INVENTION

An object of the present invention is to solve the above-described conventional shortcomings and provide a switch and an input port thereof which realize flexible switch scheduling in accordance with priorities set at data, while reducing a burden on a scheduler.

According to one aspect of the invention, a switch provided on a network for transferring data and having a plurality of input ports for receiving input of transfer data and switching execution means for switching and outputting transfer data applied through the input ports, wherein the switching execution means comprises switch core for executing switching processing, and a scheduler for conducting switch scheduling for the switching by the switch core in consideration of priorities set at the transfer data and setting the switch core, and the input port comprises a buffer for storing the transfer data allotted on a priority basis and outputting the transfer data according to results of the switch scheduling, request aggregating means for aggregating connection requests related to the transfer data which are allotted on a priority basis, allotting the connection requests in accordance with priorities which are taken into consideration in the switch scheduling and outputting the obtained requests, and data aggregating means for aggregating transfer data output from the buffer and transmitting the aggregated data to the switch core.

In the preferred construction, the switch further comprises data allotment means for allotting the transfer data on a priority basis.

In another preferred construction, the buffer is provided corresponding to each of the priorities of the transfer data.

In another preferred construction, stages of the priorities of the transfer data are more than stages of the priorities which are taken into consideration in switch scheduling conducted by the scheduler.

In another preferred construction, the switch further comprises an allotment table for setting a corresponding relationship between the priorities of the transfer data and the priorities which are taken into consideration in switch scheduling by the scheduler, wherein the request aggregating means allots the connection requests with reference to the contents set in the allotment table.

In another preferred construction, stages of the priorities of the transfer data are more than stages of the priorities which are taken into consideration in switch scheduling conducted by the scheduler, and which further comprises an allotment table for setting a corresponding relationship between the priorities of the transfer data and the priorities which are taken into consideration in switch scheduling by the scheduler, wherein the request aggregating means allots the connection requests with reference to the contents set in the allotment table.

According to another aspect of the invention, in a switch provided on a network for conducting data transfer and having a plurality of input ports for receiving input of transfer data and switching execution means responsive to a connection request of the transfer data from the input ports for conducting switch scheduling taking priorities set at the transfer data into consideration, as well as switching and outputting the transfer data, wherein the input port comprises a buffer for temporarily storing the transfer data allotted by the data allotment means and outputting the transfer data according to results of switch scheduling by the switching execution means, request aggregating means for aggregating connection requests related to the transfer data which are allotted on a priority basis, allotting and outputting the connection requests in accordance with priorities which are taken into consideration in switch scheduling conducted by the switching execution means, and data aggregating means for aggregating transfer data output from the buffer and transmitting the aggregated data to the switch core.

In the preferred construction, the input port of a switch further comprises data allotment means for allotting the transfer data on a priority basis.

In another preferred construction, the buffer is provided corresponding to each of the priorities of the transfer data.

In another preferred construction, stages of the priorities of the transfer data are more than stages of the priorities which are taken into consideration in switch scheduling conducted by the switching execution means.

In another preferred construction, the input port of a switch further comprises an allotment table for setting a corresponding relationship between the priorities of the transfer data and the priorities which are taken into consideration in switch scheduling by the switching execution means, wherein the request aggregating means allots the connection requests with reference to the contents set in the allotment table.

In another preferred construction, stages of the priorities of the transfer data are more than stages of the priorities which are taken into consideration in switch scheduling conducted by the switching execution means, and which further comprises an allotment table for setting a corresponding relationship between the priorities of the transfer data and the priorities which are taken into consideration in switch scheduling by the switching execution means, wherein the request aggregating means allots the connection requests with reference to the contents set in the allotment table.

According to a further aspect of the invention, a switch provided on a network for transferring data and having a plurality of input ports which receives input of transfer data and switch unit which switches and outputs transfer data applied through the input ports, wherein the switch unit comprises a switch core which executes switching processing, and a scheduler which conducts switch scheduling for the switching by the switch core in consideration of priorities set at the transfer data and sets the switch core, and the input port comprises a buffer which stores the transfer data allotted on a priority basis and outputs the transfer data according to results of the switch scheduling, request aggregating unit which aggregates connection requests related to the transfer data which are allotted on a priority basis, allots the connection requests in accordance with priorities which are taken into consideration in the switch scheduling and outputting the obtained requests, and data aggregating unit which aggregates transfer data output from the buffer and transmits the aggregated data to the switch core.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
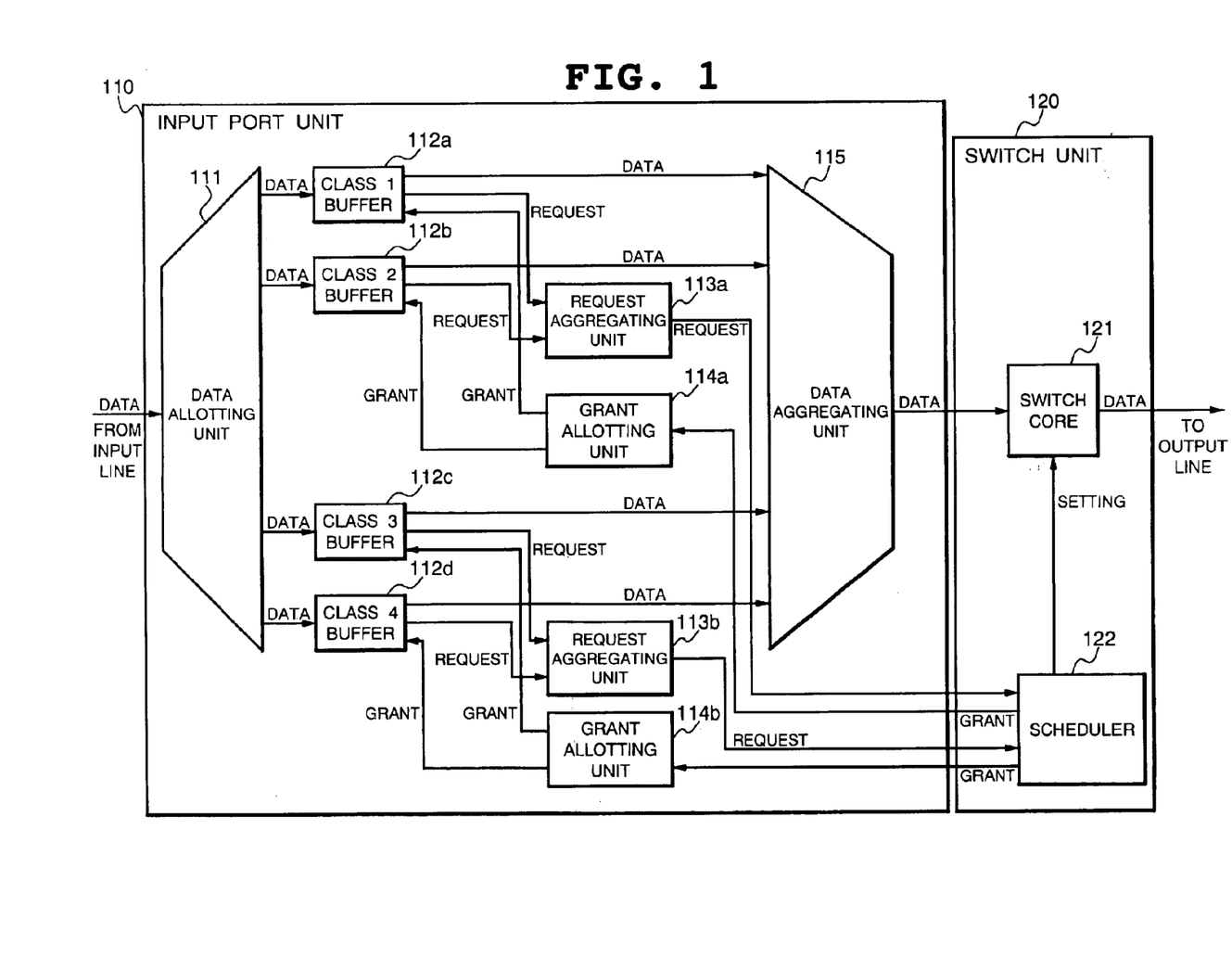
FIG. 1 is a block diagram showing a structure of a switch according to one embodiment of the present invention.

FIG. 1 is a block diagram showing a structure of a switch according to one embodiment of the present invention. With reference to FIG. 1, the switch of the present embodiment includes an input port unit 110 for receiving data and a switch unit 120 for executing switching processing. Although the input port units 110 exist as many as the number of ports of the switch unit 120, one port unit is illustrated here for the convenience of explanation. Also in FIG. 1, illustration is made only of a characteristic part of the structure of the present embodiment and that of the remaining common part is omitted. It is clear that in reality, the switch includes an output port for outputting data switched at the switch unit 120 to a desired transfer destination etc. in addition to the illustrated components.

The input port 110 includes a data allotting unit 111 for allotting input data in accordance with priorities, buffers 112a ~112d provided corresponding to data priorities, request aggregating units 113a and 113b for aggregating a connection request of each data, grant allotting units 114a and 114b for supplying a grant signal transmitted from the switch unit 120 to one of the buffers 112a-112d of an appropriate class, and a data aggregating unit 115 for aggregating data allotted to the respective buffers 112a to 112d in accordance with their priorities and sending the aggregated data to the switch unit 120.

In the present embodiment, assume that priority to be assigned to data has four stages and priority to be taken into consideration when the switch unit 120 conducts switch scheduling has two stages. Accordingly, the input port 110 is provided with four buffers 112a to 112d corresponding to the respective priorities and two request aggregating units 113a and 113b for aggregating connection requests output from the respective buffers 112a to 112d into two groups. Also assume that a buffer which stores data having the highest priority is a class 1 buffer 112a, a buffer which stores data having the second-highest priority is a class 2 buffer 112b, a buffer which stores data having the third-highest priority is a class 3 buffer 112c and a buffer which stores data having the lowest priority is a class 4 buffer 112d. In the following description, when the respective buffers need not to be specifically distinguished from each other, they will be denoted as the buffers 112a to 112d.

The data allotting unit 111 checks a header of input data received from an input line to determine its priority. Then, the unit 111 assigns the determined priority to the data as an internal header, as well as allotting and sending the data according to the priority to the buffers 112a to 112d. Description will be here made of operation of assigning priority to data by the data allotting unit 111. FIGS. 4 to 7 show examples of formats of data to be transferred. When a protocol of data to be transferred is TCP/IP, the data allotting unit 111 determines its priority with reference to a service type field of an IPv4 (version 4) header shown in FIG. 4, a priority field of an IPv6 (version 6) header shown in FIG. 5 and a port number indicating a host protocol of a TCP header shown in FIG. 6, and the like. In a case of an ATM cell, priority is determined with reference to CLP (Cell Loss Priority) shown in FIG. 7 etc. The data allotting unit 111, at the time of assigning a priority to data to be transferred, detects a destination address of the data to be transferred to determine an output port and applies the relevant information as an internal header to the data as is done in a basic switch.

The buffers 112a to 112d buffer data classified in accordance with priorities which is received from the data allotting unit 111 and output a connection request which requests switch connection of buffered data to an output destination to the switch unit 120 through the request aggregating units 113a and 113b.

In addition, upon receiving a grant signal which is output from the switch unit 120 and indicates allowance of a connection of buffered data to an output destination through the grant allotting units 114a and 114b, the buffers 112a to 112d send the data to the switch unit 120 for transferring the data to the connection destination indicated by the grant signal.

The request aggregating units 113a and 113b receive input of a connection request output from the buffers 112a to 112d to take a logical sum of the connection request and notifies the switch unit 120 of the result. In the present embodiment, connection requests output from the class 1 buffer 112a and the class 2 buffer 112b are aggregated by the request aggregating unit 113a and connection requests output from the class 3 buffer 112c and the class 4 buffer 112d are aggregated by the request aggregating unit 113b as shown in FIG. 1. As a result, connection requests of data distributed in four stages according to their priorities are aggregated into two groups which will be sent to the switch unit 120.

The grant allotting units 114a and 114b receive a grant signal output from the scheduler 122 of the switch unit 120, check a connection destination indicated by the grant signal and notifies the grant signal in question to a buffer having the highest priority among the buffers 112a to 112d which store data directed to the connection destination. In the present embodiment, as illustrated in FIG. 1, a grant signal received by the grant allotting unit 114a is notified to the class 1 buffer 112a or the class 2 buffer 112b and a grant signal received by the grant allotting unit 114b is notified to the class 3 buffer 12c or the class 4 buffer 112d. When data designating the connection destination which is indicated by the grant signal received by the grant allotting unit 114a exists in both of the class 1 buffer 112a and the class 2 buffer 112b, the grant allotting unit 114a notifies the grant signal in question to the class 1 buffer 112a having a higher priority. Similarly, when data designating the connection destination which is indicated by the grant signal received by the grant allotting unit 114b exists in both of the class 3 buffer 112c and the class 4 buffer 112d, the unit 114b notifies the grant signal in question to the class 3 buffer 112c having a higher priority.

The data aggregating unit 115 aggregates data output from the buffers 112a to 112d and sends the aggregated data to the switch unit 120.

The switch unit 120 includes a switch core 121 for switching and outputting data applied through the input port 110 and a scheduler 122 for setting connection of the switch core 121 to control switching.

The switch core 121 sets switch connections between a plurality of input ports and a plurality of output ports according to the setting by the scheduler 122.

The scheduler 122 receives connection requests output from the respective input port units 110 to conduct scheduling of switch connections. In the present embodiment, connection requests received through the respective input ports 110 are of two kinds, one output from the request aggregating unit 113a and the other output from the request aggregating unit 113b, and the former request has a higher priority. Scheduling by the scheduler 122 is conducted individually for each class of priorities while giving priority to scheduling results of a higher class. More specifically, when a connection request output from the request aggregating unit 113a of a predetermined input port unit 110 and a connection request output from the request aggregating unit 113b of a predetermined input port unit 110 make a request for connection to the same output port, the connection request output from the request aggregating unit 113a having a higher priority is given priority in the assignment of a switch connection to the output port in question. The scheduler 122, similarly to conventional schedulers, conducts scheduling of connection requests with respect to a plurality of input ports of the same class.

In addition, based on the scheduling results, the scheduler 122 notifies connection setting information for setting switch connection to the switch core 121 and notifies connection allowance (grant signal) indicating an output port to be connected to the input port unit 110 having a switch connection set.

Operation of the present invention will be described in the following.

First, when data is applied to the input port unit 110, the data allotting unit 111 distributes the input data into four stages of priorities and stores the same in the buffers 112a to 112d. Next, the buffers 112a to 112d output a request for connection to an output port which is a destination of the input data in question. Then, the request aggregating units 113a and 113b aggregate the connection requests two by two and notify, to the scheduler 122 of the switch unit 120, the obtained requests as connection requests having two stages of priorities which can be scheduled by the scheduler 122.

More specifically, the request aggregating unit 113a synthesizes the connection request output from the class 1 buffer 112a and the connection request output from the class 2 buffer 112b and the request aggregating unit 113b synthesizes the connection request output from the class 3 buffer 112c and the connection request output from the class 4 buffer 112d to aggregate into two classes to be output.

A request synthesizing method may be logical sum operation. For example, when a connection request with output ports L and M as destinations is notified from the class 1 buffer 112a and a connection request with output ports M and N as destinations is notified from the class 2 buffer 112b, destinations of connection requests aggregated by the request aggregating unit 113a will be the output ports L, M and N.

Next, the scheduler 122 schedules connection requests received from the plurality of input port units 110 individually for each class of priorities. A request of a class having a higher priority is given priority in the scheduling. Then, based on scheduling results, the scheduler 122 sets switch connections between a plurality of input ports and a plurality of output ports of the switch core 121 and in response to a connection request having the connection assigned, notifies a grant signal indicating an output port of the connection destination.

Next, the grant allotting units 114a and 114b allot the grant signals received from the scheduler 122 to the buffers 112a to 112d. At this occasion, the units 114a and 114b check data stored in the respective buffers 112a to 112d and when a plurality of buffers exist which store data to an output destination indicated by the grant signal, allot the grant signals to the buffers 112a and 112c having a higher priority. For example, when the grant allotting unit 114a receives a grant signal indicative of allowance of connection to the output port M from the scheduler 122 and both of the class 1 buffer 112a and the class 2 buffer 112b store data whose destination is the output port M, the unit 114a notifies the class 1 buffer 112a having a higher priority of the grant signal in question.

Next, the buffers 112a to 112d having received the grant signal send out data whose destination is the output port indicated by the grant signal. Then, the data aggregating unit 115 transmits the data output from the buffers 112a to 112d to the switch core 121. Lastly, the switch core 121 having received the data conducts switching based on the setting by the scheduler 122 to transfer the received data to the output port.

Figure 2:
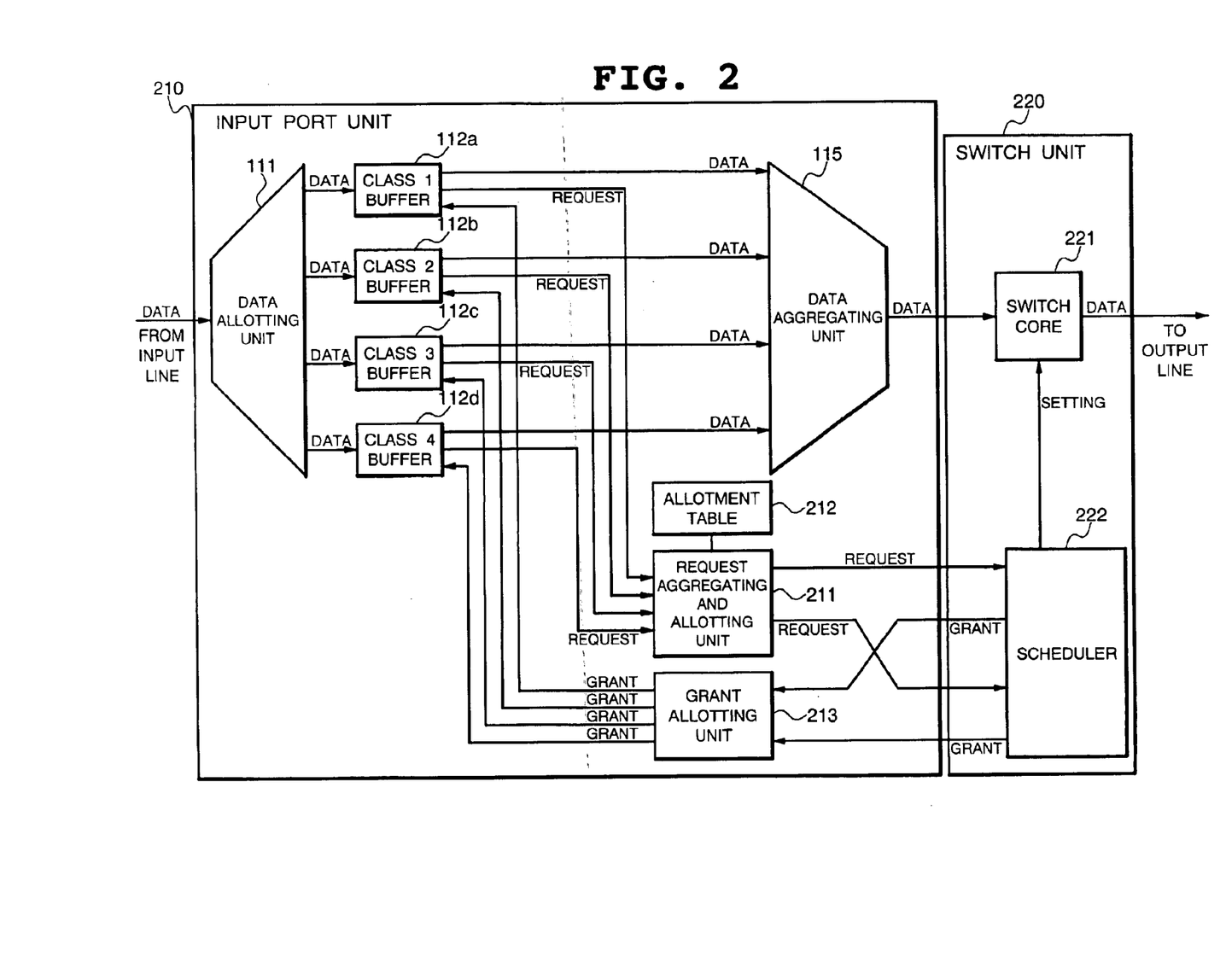
FIG. 2 is a block diagram showing a structure of a switch according to another embodiment of the present invention.

FIG. 2 is a block diagram showing a structure of a switch according to another embodiment of the present invention. With reference to FIG. 2, the switch of the present embodiment includes an input port unit 210 for receiving data and a switch unit 220 for executing switching processing. Although the input port units 210 exist as many as the number of ports of the switch unit 220, one port is illustrated here for the convenience of explanation. Also in FIG. 2, illustration is made only of a characteristic part of the structure of the present embodiment and that of the remaining common part is omitted. It is clear that in reality, the switch includes an output port for outputting data switched by the switch unit 220 to a desired transfer destination and the like in addition to the illustrated components. Assume also in the present embodiment that priorities assigned to data are of four stages and priorities to be taken into consideration when the switch unit 220 conducts switch scheduling is of two stages.

The input port 210 includes a data allotting unit 111 for allotting input data on a priority basis, buffers 112a-112d provided corresponding to data priorities, a request aggregating and allotting unit 211 for aggregating and allotting a connection request of each data and an allotment table 212, a grant allotting unit 213 for supplying a grant signal transmitted from the switch unit 220 to one of the buffers 112a-112d of an appropriate class, and a data aggregating unit 115 for aggregating data allotted to the buffers 112a to 112d on a priority basis and sending the data to the switch unit 220.

In the above-described structure, since the data allotting unit 111, the buffers 112a to 112d and the data aggregating unit 115 are the same as the data allotting unit 111, the buffers 112a to 112d and the data aggregating unit 115 of the first embodiment shown in FIG. 1, the same reference numerals are assigned thereto to omit their description.

The switch unit 220 includes a switch core 221 for switching and outputting data applied through the input port unit 110 and a scheduler 222 for setting a connection of the switch core 221 to control switching. The switch core 221 operates in the same manner as that of the switch core 121 in the first embodiment shown in FIG. 1. The scheduler 222 operates in the same manner as that of the scheduler 122 in the first embodiment shown in FIG. 1.

The request aggregating and allotting unit 211 of the input port unit 210 receives input of connection requests output from the buffers 112a to 112d, takes a logical sum of the connection requests and notifies the switch unit 220 of the result. In the present embodiment, the aggregated connection requests are distributed into two stages of priorities and output. Connection request allotment is conducted based on the setting of the allotment table 212.

Figure 3:
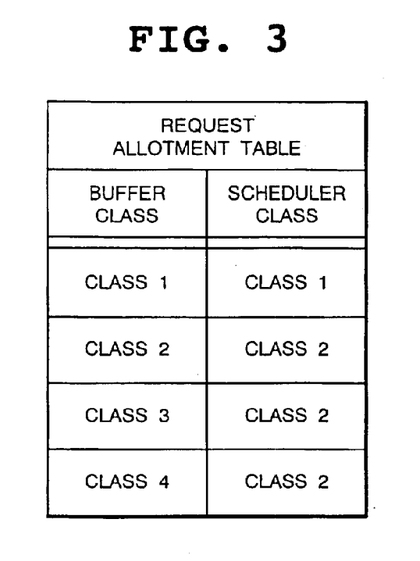
FIG. 3 is a diagram showing an example of a structure of an allotment table in the switch of FIG. 2.
Figure 4:
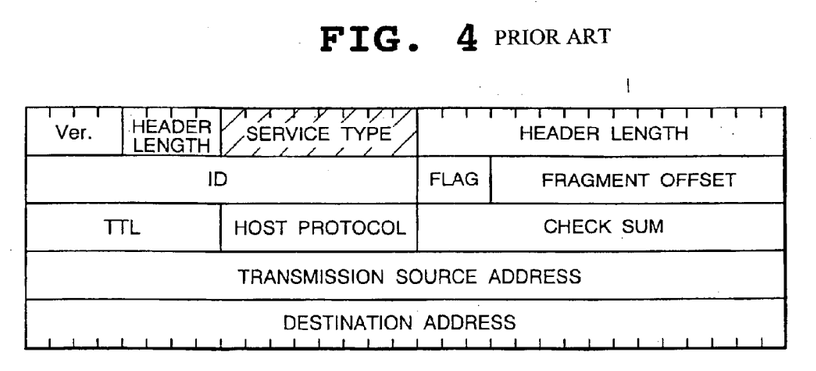
FIG. 4 is a diagram showing a format of an IPv4 (version 4) header in TCP/IP.
Figure 5:
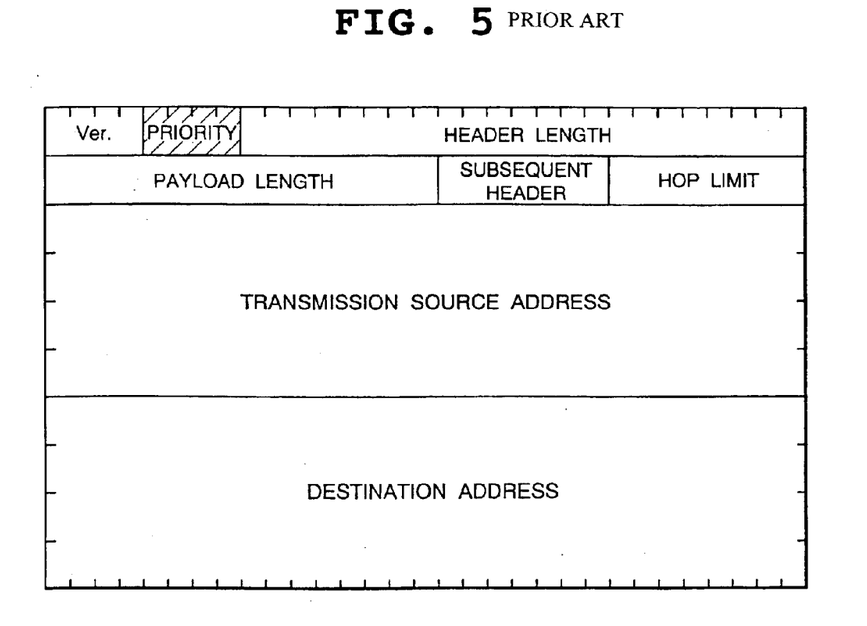
FIG. 5 is a diagram showing a format of an IPv6 (version 6) header in TCP/IP.
Figure 6:
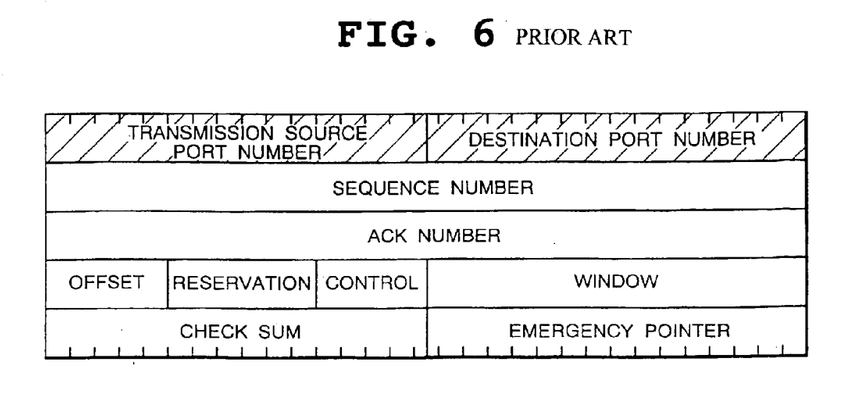
FIG. 6 is a diagram showing a format of a host protocol of a TCP header in TCP/IP.
Figure 7:
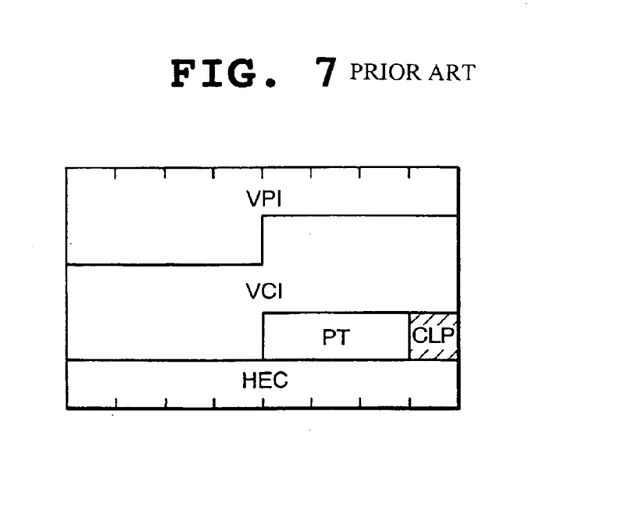
FIG. 7 is a diagram showing a format of a header of an ATM cell.

The allotment table 212 sets a basis for allotting connection requests aggregated by the request aggregating and allotting unit 211. In other words, the unit 212 sets a corresponding relationship between a priority set by the data allotting unit 111 and a priority to be taken into consideration in the processing of the scheduler 222. More specifically, the unit 212 prescribes to which priority that is taken into consideration at the processing of the scheduler 222 a connection request output from which of the buffers 112a to 112d is allotted. FIG. 3 shows an example of contents set at the allotment table 212. With reference to FIG. 3, the allotment table 212 prescribes that only a connection request of the class 1 buffer 112a is scheduled as a connection request having the class 1 of priority (higher) and connection requests of the remaining buffers 112b to 112d are scheduled as connection requests having the class 2 of priority (lower).

The grant allotting unit 213 aggregates grant signals of two stages of priorities received from the scheduler 122, then checks a connection destination indicated by the grant signal and notifies the grant signal to a buffer having the highest priority among the buffers 112a to 112d which store data for the connection destination.

Operation of the present embodiment is the same as that of the first embodiment shown in FIG. 1 with the only difference of the operation by the request aggregating and allotting unit 211 to aggregate connection requests output from the respective buffers 112a to 112d, allot the requests based on setting of the allotment table 212 and notify the results to the scheduler 222 of the switch unit 220, and the operation by one grant allotting unit 213 to, after once aggregating grant signals received from the scheduler 222, allot the signals based on priorities set corresponding to the buffers 112a to 112d.

Since in the present embodiment, connection requests output from the buffers 112a to 112d are aggregated and with reference to the allotment table 212, allotted according to priorities which are taken into consideration in the processing of the scheduler 222 as described above, change of setting of the allotment table 212 enables flexible change of a manner of connection request allotment. As a result, switching characteristics at each priority can be changed flexibly.

As described in the foregoing, according to the switch and the input port thereof of the present invention, after allotting transfer data based on priorities arbitrarily set, connection requests generated based on transfer data of each of the priorities are aggregated and allotted in accordance with priorities which are taken into consideration in the processing of a scheduler of a switch unit, so that stages of priorities employed in the processing of the scheduler can be less than the stages of priorities set at the transfer data. It is therefore possible not only to realize flexible switch scheduling according to priorities set at data but also to reduce a burden on a scheduler, as well as reducing the amount of hardware of the scheduler to decrease the amount of processing.

In addition, since allotment of connection requests is conducted based on an allotment table set in advance, change of setting of the allotment table enables a manner of allotting connection requests to be changed freely, whereby switching characteristics at each priority can be modified flexibly.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A switch provided on a network for transferring data and having a plurality of input ports for receiving input of transfer data and switching execution means for switching and outputting transfer data applied through said input ports, wherein said switching execution means comprising:

a switch core for executing switching processing and a scheduler for conducting switch scheduling for the switching by said switch core in consideration of priorities set at said transfer data and setting said switch core, and said input port comprising:

a plurality of buffers for storing said transfer data allotted on a priority basis and outputting said transfer data according to results of said switch scheduling, the number of said plurality of buffers corresponding to the number of said priorities of said transfer date, request aggregating means for aggregating connection requests related to said transfer data which are allotted on a priority basis, allotting the connection requests in accordance with priorities which are taken into consideration in said switch scheduling and outputting the obtained requests, said request aggregation means synthesizing said connection requests utilizing a synthesizing method, and data aggregating means for aggregating transfer data output from said buffer and transmitting the aggregated data to said switch core.

2. The switch as set forth in claim 1, further comprising data allotment means for allotting said transfer data on a priority basis.

3. The switch as set forth in claim 2, wherein the number of stages of the priorities of said transfer data is greater than the number of stages of the priorities which are taken into consideration in switch scheduling conducted by said scheduler.

4. The switch as set forth in claim 1, further comprising an allotment table for setting a corresponding relationship between the priorities of said transfer data and the priorities which are taken into consideration in switch scheduling by said scheduler, wherein said request aggregating means allots said connection requests with reference to the contents set in said allotment table.

5. The switch as set forth in claim 1, wherein the number of stages of the priorities of said transfer data is greater than the number of stages of the priorities which are taken into consideration in switch scheduling conducted by said scheduler, and which further comprises an allotment table for setting a corresponding relationship between the priorities of said transfer data and the priorities which are taken into consideration in switch scheduling by said scheduler, wherein said request aggregating means allots said connection requests with reference to the contents set in said allotment table.

6. In a switch provided on a network for conducting data transfer and having a plurality of input ports for receiving input of transfer data and switching execution means responsive to a connection request of said transfer data from said input ports for conducting switch scheduling taking priorities of said transfer data into consideration, as well as switching and outputting said transfer data, wherein said input port comprises:

a plurality of buffers corresponding in number to the number of priorities of said transfer data, said plurality of buffers temporarily storing said transfer data allotted by data allotment means and outputting said transfer data according to results of switch scheduling by said switching execution means, said request aggregation means synthesizing said connection requests utilizing a synthesizing method employing a logical sum operation, request aggregating means for aggregating connection requests related to said transfer data which are allotted on a priority basis, allotting and outputting the connection requests in accordance with priorities which are taken into consideration in switch scheduling conducted by said switching execution means, and data aggregating means for aggregating transfer data output from said buffer and transmitting the aggregated data to said switch core.

7. The input port of a switch as set forth in claim 6, further comprising data allotment means for allotting said transfer data on a priority basis.

8. The input port of a switch as set forth in claim 6, wherein the number of stages of the priorities of said transfer data is greater than the number of stages of the priorities which are taken into consideration in switch scheduling conducted by said switching execution means.

9. The input port of a switch as set forth in claim 6, further comprising an allotment table for setting a corresponding relationship between the priorities of said transfer data and the priorities which are taken into consideration in switch scheduling by said switching execution means, wherein said request aggregating means allots said connection requests with reference to the contents set in said allotment table.

10. The input port of a switch as set forth in claim 6, wherein the number of stages of the priorities of said transfer data is greater than the number of stages of the priorities which are taken into consideration in switch scheduling conducted by said switching execution means, and which further comprises an allotment table for setting a corresponding relationship between the priorities of said transfer data and the priorities which are taken into consideration in switch scheduling by said switching execution means, wherein said request aggregating means allots said connection requests with reference to the contents set in said allotment table.

11. A switch provided on a network for transferring data and having a plurality of input ports which receives input of transfer data and switch unit which switches and outputs transfer data applied through said input ports, wherein said switch unit comprising:

a switch core which executes switching processing, and a scheduler which conducts switch scheduling for the switching by said switch core in consideration of priorities set at said transfer data and sets said switch core, and said input port comprising:

a plurality of buffers which stores said transfer data allotted on a priority basis and outputs said transfer data according to results of said switch scheduling, the number of said plurality of buffers corresponding to the number of said priorities of said transfer date, request aggregating unit which aggregates connection requests related to said transfer, data which are allotted on a priority basis, allots the connection requests in accordance with priorities which are taken into consideration in said switch scheduling and outputting the obtained requests, said request aggregation means synthesizing said connection requests utilizing a synthesizing method employing a logical sum operation, and data aggregating unit which aggregates transfer data output from said buffer and transmits the aggregated data to said switch core.

12. The switch as set forth in claim 11, further comprising data allotment unit which allots said transfer data on a priority basis.

13. The switch as set forth in claim 12, wherein the number of stages of the priorities of said transfer data is greater than the number of stages of the priorities which are taken into consideration in switch scheduling conducted by said scheduler.

14. The switch as set forth in claim 11, further comprising an allotment table which sets a corresponding relationship between the priorities of said transfer data and the priorities which are taken into consideration in switch scheduling by said scheduler, wherein said request aggregating unit allots said connection requests with reference to the contents set in said allotment table.

15. The switch as set forth in claim 11, wherein the number of stages of the priorities of said transfer data is greater than the number of stages of the priorities which are taken into consideration in switch scheduling conducted by said scheduler, and which further comprises an allotment table which sets a corresponding relationship between the priorities of said transfer data and the priorities which are taken into consideration in switch scheduling by said scheduler, wherein said request aggregating unit allots said connection requests with reference to the contents set in said allotment table.

* * * * *